US011276335B2

(12) United States Patent
Angott et al.

(10) Patent No.: US 11,276,335 B2
(45) Date of Patent: Mar. 15, 2022

(54) SCROLLING BILLBOARD AND METHOD OF OPERATION

(71) Applicant: Innovative Billboards LLC, Bloomfield Hills, MI (US)

(72) Inventors: Paul G. Angott, Bloomfield Hills, MI (US); Randy Gu, Rochester Hills, MI (US); Michael A. Latcha, Redford, MI (US); Hugo F. Pimentel, Pontiac, MI (US)

(73) Assignee: INNOVATIVE BILLBOARDS LLC, Bloomfield Hills, MI (US)

( * ) Notice: Subject to any disclaimer, the term of this patent is extended or adjusted under 35 U.S.C. 154(b) by 0 days.

(21) Appl. No.: 17/094,285

(22) Filed: Nov. 10, 2020

(65) Prior Publication Data
US 2021/0233440 A1    Jul. 29, 2021

Related U.S. Application Data

(62) Division of application No. 16/752,228, filed on Jan. 24, 2020, now Pat. No. 10,832,599.

(51) Int. Cl.
*G09F 11/295* (2006.01)
*G09F 11/21* (2006.01)
(Continued)

(52) U.S. Cl.
CPC .......... *G09F 11/295* (2013.01); *G06T 7/0002* (2013.01); *G06T 7/90* (2017.01);
(Continued)

(58) Field of Classification Search
CPC .......... G09F 11/21; G09F 11/22; G09F 11/18; G09F 11/29; G09F 11/295;
(Continued)

(56) References Cited

U.S. PATENT DOCUMENTS

| 649,459 A | 5/1900 | Mihill |
| 1,740,517 A | 12/1929 | Margeson |

(Continued)

FOREIGN PATENT DOCUMENTS

| CN | 2938294 Y | 8/2007 |
| DE | 19603585 A1 | 8/1997 |

(Continued)

OTHER PUBLICATIONS

International Search Report for PCT/US2021/014578, prepared by the U.S. Patent and Trademark Office, dated Jul. 1, 2021.

*Primary Examiner* — Gary C Hoge
(74) *Attorney, Agent, or Firm* — Brooks Kushman P.C.

(57) ABSTRACT

A scrolling billboard having a frame, a first pair of mandrels mounted within the frame supporting an elongate banner having multiple sign images. One sign image is viewable within the frame opening. A pair of sign drive motors are connected to the first pair of mandrels. A second pair of mandrels move a curtain relative to the frame opening between a blocked position where view of the sign is obstructed and a viewing position in which view of the sign is unobstructed. The mandrels are tubular and internally supported by mandrel supports to prevent sagging. A controller cooperates with the sign and curtain drive motors to change the viewable image by: moving the curtain to the closed position, changing the sign image, and returning the curtain to the viewing position. An add/remove fixture is disclosed to insert or remove signs from the banner. A corresponding method is also disclosed.

10 Claims, 16 Drawing Sheets

(51) Int. Cl.
  *G06T 7/90* (2017.01)
  *G06T 7/00* (2017.01)
  *G09F 11/00* (2006.01)

(52) U.S. Cl.
  CPC ...... *G09F 11/21* (2013.01); *G09F 2011/0036* (2013.01); *G09F 2011/0072* (2013.01)

(58) Field of Classification Search
  CPC ..... G09F 2011/0009; G09F 2011/0018; G09F 2011/0036
  See application file for complete search history.

(56) References Cited

U.S. PATENT DOCUMENTS

| | | | |
|---|---|---|---|
| 1,749,784 A | | 3/1930 | Slotsky |
| 2,419,802 A | | 4/1947 | Van Horne |
| 2,935,806 A | | 5/1960 | Young, Sr. |
| 3,007,100 A | | 10/1961 | Bettcher |
| 3,334,432 A | | 8/1967 | Bates et al. |
| 3,426,461 A | | 2/1969 | Miller |
| 3,510,973 A | | 5/1970 | Mazzocco, Sr. |
| 3,616,554 A | | 11/1971 | Singer et al. |
| 3,726,031 A | * | 4/1973 | Singer .................. G09F 11/29 40/471 |
| 3,780,458 A | | 12/1973 | Jacoby et al. |
| 3,786,582 A | | 1/1974 | Ralbowsky |
| 3,829,997 A | | 8/1974 | Singer |
| 3,839,808 A | | 10/1974 | Singer |
| 4,110,925 A | | 9/1978 | Strand et al. |
| 4,162,585 A | | 7/1979 | Decaux |
| 4,773,176 A | | 9/1988 | Grehan |
| 5,072,533 A | | 12/1991 | Heinz et al. |
| 5,355,601 A | | 10/1994 | Paulsen |
| 5,410,830 A | | 5/1995 | Aiken |
| 5,488,791 A | | 2/1996 | Boni |
| 5,597,994 A | | 1/1997 | Hornung |
| 5,673,504 A | | 10/1997 | Brown |
| 5,687,498 A | * | 11/1997 | Keyser .................. G09F 11/21 40/471 |
| 5,809,677 A | * | 9/1998 | Wamser .................. G09F 11/21 40/471 |
| 5,946,836 A | | 9/1999 | Sahebolamri |
| 5,953,840 A | | 9/1999 | Simson et al. |
| 6,055,753 A | | 5/2000 | Sondericker |
| 6,178,674 B1 | | 1/2001 | Decaux et al. |
| 6,252,575 B1 | | 6/2001 | Kern |
| 6,557,281 B1 | * | 5/2003 | Lewiner .................. G09F 11/29 40/471 |
| 6,691,441 B1 | | 2/2004 | Crivelli et al. |
| 2001/0010133 A1 | | 8/2001 | Schoening |
| 2002/0018055 A1 | * | 2/2002 | Smith .................. G09F 11/295 345/204 |
| 2002/0144444 A1 | * | 10/2002 | Shih .................. G09F 13/0413 40/715 |
| 2002/0184804 A1 | | 12/2002 | Toraby-Payhan |
| 2003/0046847 A1 | * | 3/2003 | Yoshida .................. G09F 27/00 40/717 |
| 2003/0089009 A1 | | 5/2003 | Peel |
| 2004/0064987 A1 | * | 4/2004 | Bihr .................. G09F 11/24 40/518 |
| 2004/0064988 A1 | | 4/2004 | Schoning |
| 2004/0111936 A1 | | 6/2004 | Jones |
| 2006/0162201 A1 | * | 7/2006 | Brahmig .................. G09F 15/0012 40/514 |
| 2006/0207136 A1 | | 9/2006 | Blum |
| 2007/0150353 A1 | | 6/2007 | Krassner et al. |
| 2007/0209251 A1 | | 9/2007 | Zheng et al. |
| 2008/0236003 A1 | | 10/2008 | Raccah |
| 2008/0263921 A1 | * | 10/2008 | Kim .................. G09F 11/29 40/407 |
| 2009/0151209 A1 | | 6/2009 | Blanc et al. |
| 2010/0101125 A1 | * | 4/2010 | Kim .................. G09F 11/21 40/518 |
| 2010/0107461 A1 | * | 5/2010 | Carter .................. G09F 13/22 40/514 |
| 2010/0186272 A1 | * | 7/2010 | Ophoff .................. G09F 11/295 40/467 |
| 2015/0373396 A1 | | 12/2015 | Makhlouf |
| 2017/0236458 A1 | | 8/2017 | Kim |

FOREIGN PATENT DOCUMENTS

| | | |
|---|---|---|
| FR | 2915825 A1 | 11/2008 |
| KR | 20080086566 A | 9/2008 |
| PH | 2016000688 U1 | 10/2016 |
| WO | 9734283 A1 | 9/1997 |
| WO | 04111983 A2 | 12/2004 |

\* cited by examiner

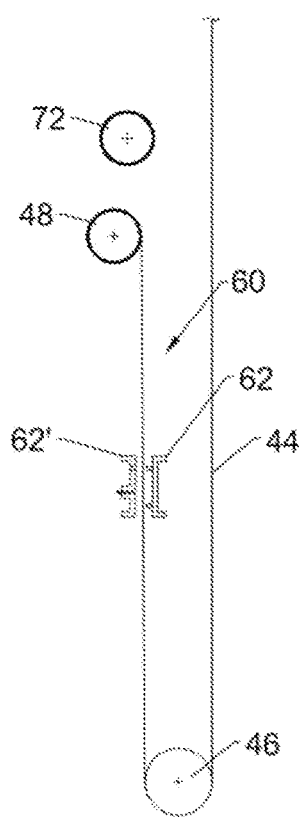
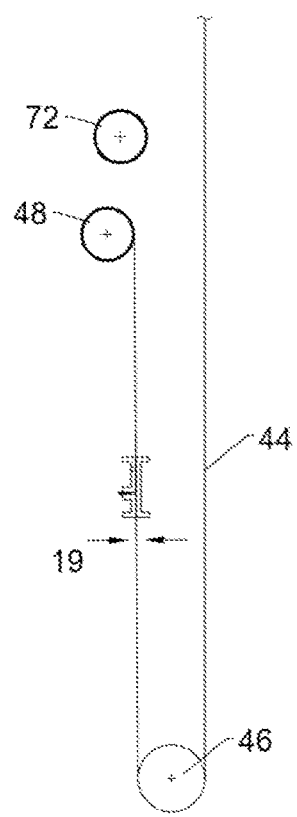
FIG. 7A
FIG. 7B
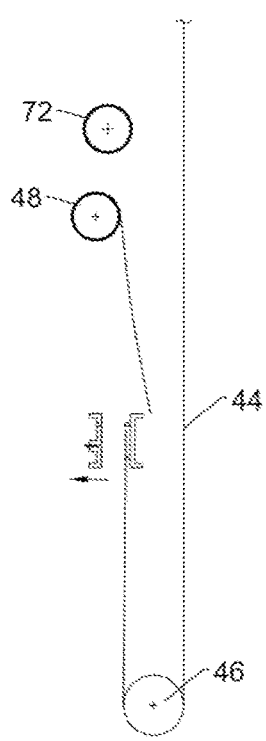
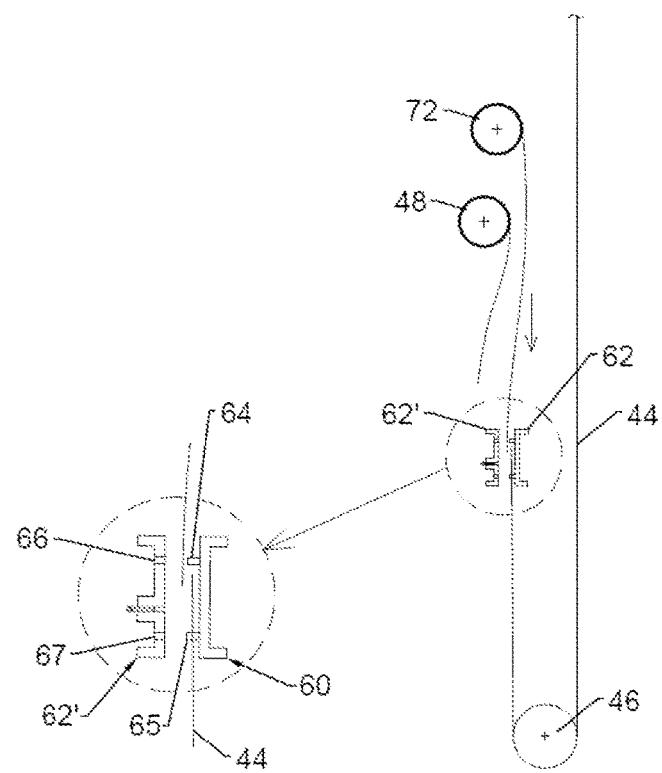
FIG. 7C
FIG. 7D

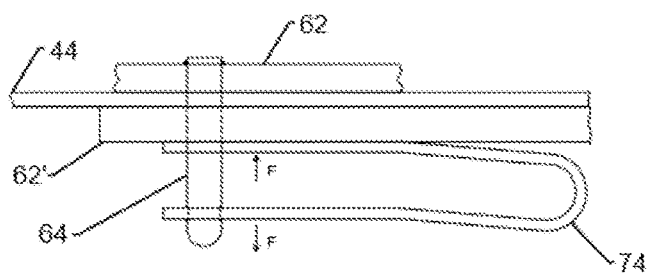
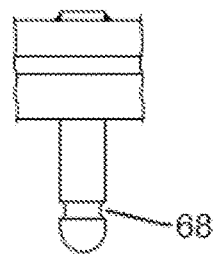
FIG. 9A              FIG. 9B
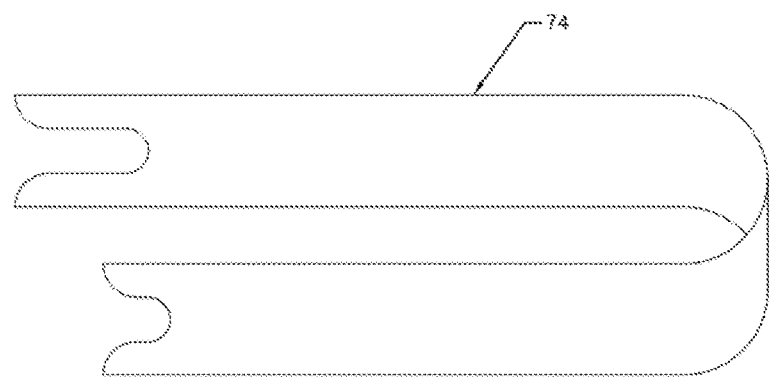
FIG. 9C
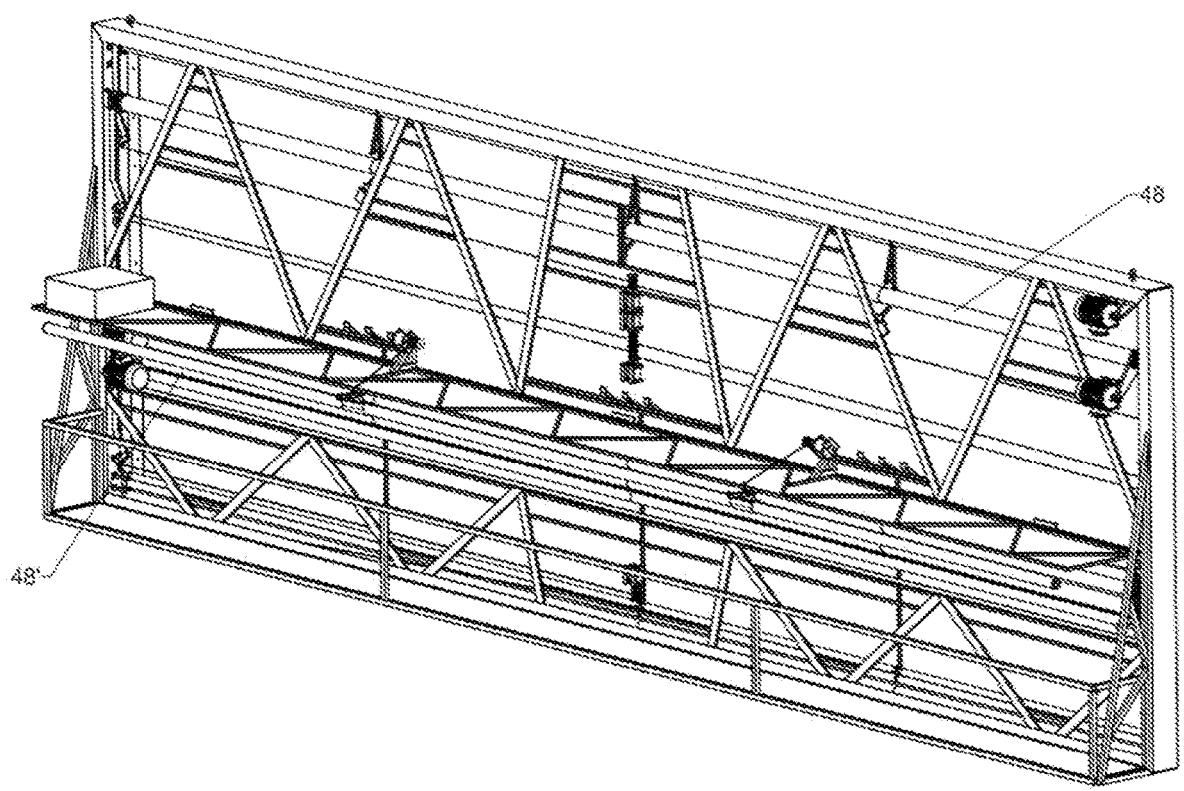
FIG. 10

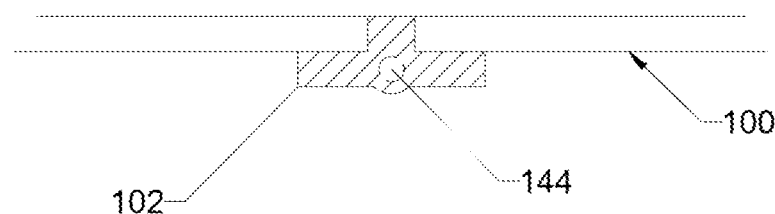
FIG. 17
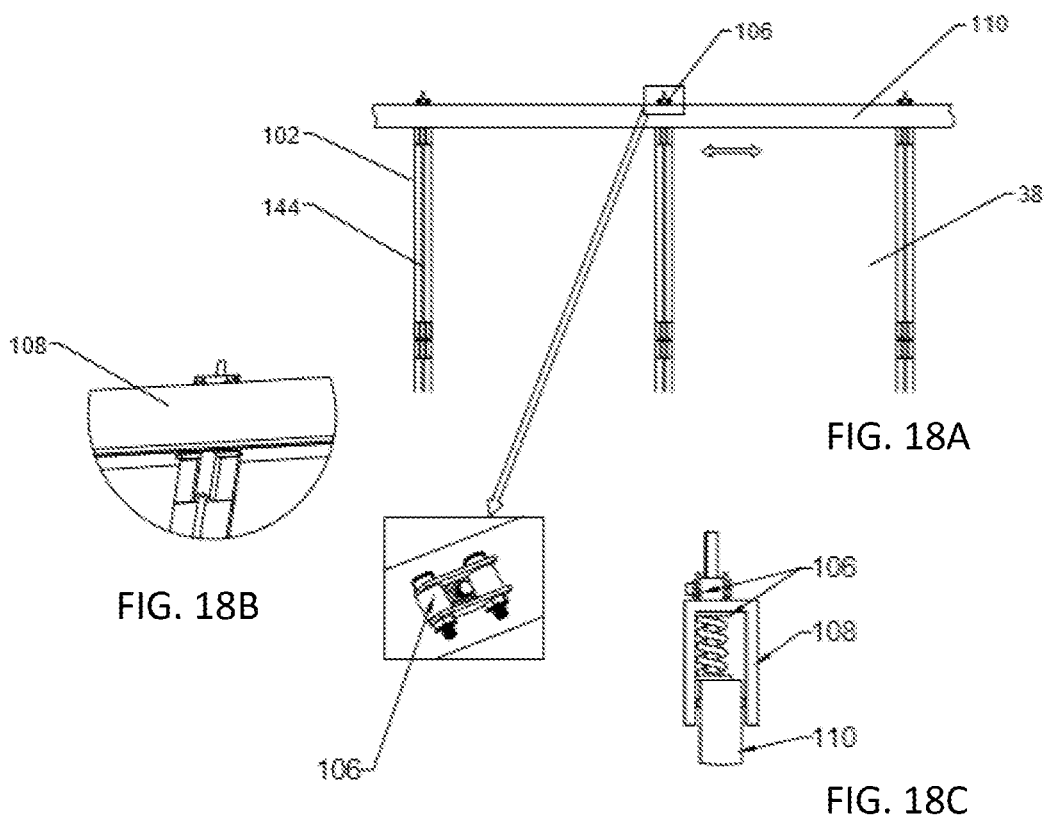
FIG. 18A
FIG. 18B
FIG. 18C
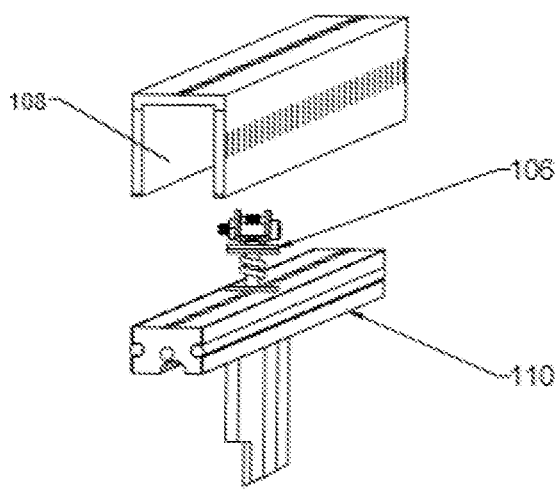
FIG. 18D

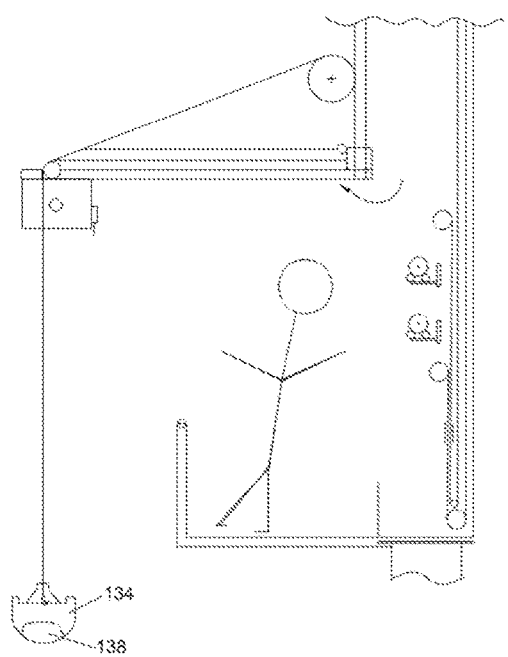
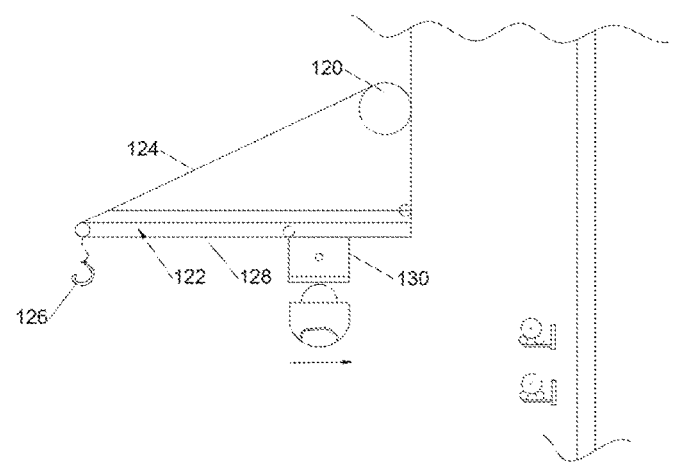
FIG. 21A    FIG. 21B
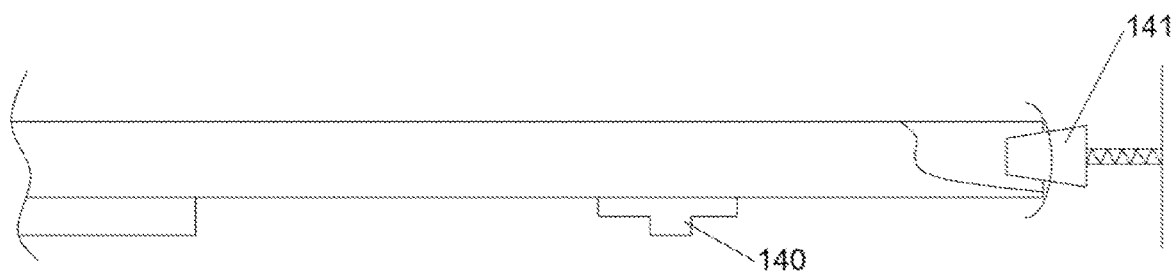
FIG. 21C
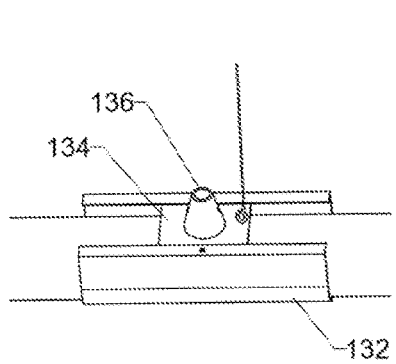 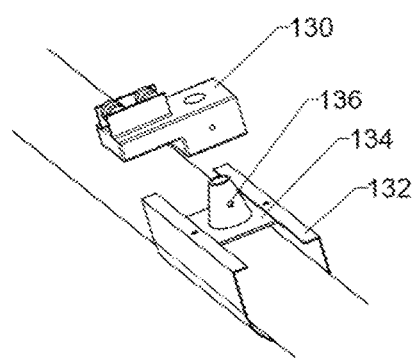 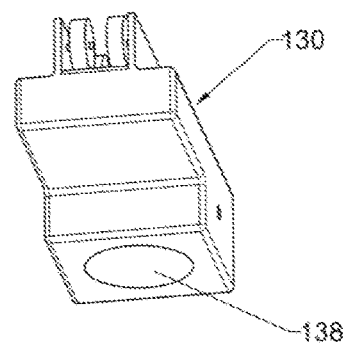
FIG. 22A    FIG. 22B    FIG. 22C

SCROLLING BILLBOARD AND METHOD OF OPERATION

CROSS-REFERENCE TO RELATED APPLICATIONS

This application is a division of U.S. application Ser. No. 16/752,228 filed Jan. 24, 2020, now U.S. Pat. No. 10,832,599 issued Nov. 10, 2020, the disclosure of which is hereby incorporated in its entirety by reference herein.

TECHNICAL FIELD

This application relates to large format scrolling billboard suitable for outdoor use and the associated method of scrolling billboard the billboard. Particularly the apparatus and method used for adding and removing signs from the scrolling banner in the billboard.

BACKGROUND

Billboards have been used in outdoor advertising for well over a hundred years. As the industry has matured in North America, billboards have generally fallen into two sized formats, a large highway sign format which is approximately 14 feet by 48 feet long and a smaller bulletin format which is approximately 8 feet high and 20 feet long. The sign image is frequently printed on a waterproof paper or a plastic film and adhered or mounted on permanent a sign structure. These signs are designed to be periodically replaced to change the sign image or to replace a worn or faded sign.

Changing a conventional billboard sign takes a significant amount of time and labor in addition to the cost of the new sign material. In the last ten years LED billboards are starting to be utilized in high traffic locations where there is a strong demand for billboard space. The significant advantage of an LED sign over a conventional static sign is that the images can be quickly changed without requiring labor, and greater revenue can be achieved from a given sign location by cycling between a series of sign images which can vary depending on the time of day and the demographics of the expected traffic passing by the sign. The use of LED billboards has raised a number of concerns with different municipalities. The signs can be distracting if changed quickly or if they present a moving image. Similarly, the signs can be very bright and change the look of the environment. Accordingly, several municipalities and even some states have banned or restricted the use of LED signs. Yet another significant disadvantage of LED signs is their cost. The cost and installation of a 40-foot LED sign can cost over $150,000 dollars and incur significant ongoing utility bills to power the sign.

An alternative way of rapidly changing sign images is to display a sign printed on a roll of sign paper suspended between two rollers, where rotating the rollers causes a sign to scroll. Scrolling signs date back over one hundred years, however they never have been widely adopted in outdoor signage. Scrolling signs tend to be very small and it is difficult to add or remove signs once the scroll has been printed. An example of a scrolling sign used currently are scrolling signs used in major league baseball parks behind home plate. These signs are typically 3 feet by 10 feet in size and scroll between two or more images during the ball game.

SUMMARY

The Applicant has sought to develop a scrolling billboard suitable for outdoor use which can be built in the large billboard sized formats to quickly scroll between a series of signs wound about two spaced apart mandrels. The preferred sign embodiment disclosed has a number of features which are independently novel, which can be used alone or in combination in a scrolling billboard. One such feature is a curtain mounted in front of the scrolling sign which would block the sign from view when the sign is scrolling, with the curtain moving to an open position when the sign has been indexed so that the view is unobstructed. At least one drive motor operates the curtain which is controlled by a controller programmed to coordinate the movement of the sign and curtain during sign changes. Use of the curtain minimizes distraction of drivers when the scrolling billboard is placed by a highway. This provides a cleaner presentation of the advertising media on the sign.

The scrolling billboard includes a frame surrounded by a sign which is between a pair of spaced apart mandrels supporting an elongate banner having multiple sign images. The frame provides the general enclosure with an open front through which the sign can be viewed. The frame opening is covered by a transparent plastic window, protecting the sign from weather and resisting sign fluttering when exposed to high winds.

One of the novel features of the preferred embodiment, which can be used alone or in combination with the other novel features presented, is a system for adding or removing signs by cutting the sign banner to remove a sign and/or insert a new sign into the banner. The add/remove sign feature is provided by a cutting guide positioned adjacent the backside of the elongate banner, a splicing station to facilitate the positioning of the new sign, and the attachment of the sign to the existing banner in proper alignment. The controller monitors the addition or the removal of signs to the banner in order to control their sequential presentation.

Another novel feature of the preferred embodiment, which can be used alone or in combination with the other novel features presented, is a system of mandrel supports which project into the tubular mandrels supporting the sign banner. The mandrel support bias the mandrels upwardly with enough force to minimized sagging do to the weight of the sign banner. The mandrel supports are adjusted as the weight of the banner wound about the mandrel varies. The controller monitors the sign weight and signals a drive motors to adjust the mandrel supports.

Another feature of the preferred billboard is a digital camera affixed to an elongate arm mounted to the billboard frame enabling the digital camera to periodically capture and store the time stamp image of the digital color image. The stored color image can be utilized to monitor changes in sign color, record the time images displayed, and to monitor sign illumination level. Preferably, sign illumination length is coupled to the camera controller providing sign imaging data to a remote server accessible by remote users. The use of the digital camera associated with the sign provides the novel method of monitoring billboards in an outdoor advertising network enabling the advertisers to monitor the image, color, and illumination of their sign. This digital camera system and method is particularly useful when used with a scrolling billboard when an advertisers image may be periodically displayed along with other advertisers having images on the same banner roll.

BRIEF DESCRIPTION OF THE DRAWINGS

FIGS. 7A-7H are a series of series of partial side views showing the process for adding a sign to the elongate banner;

FIGS. 9A-9C depict the spring clamp for urging the add/remove fixture elongate beams together;

FIG. 10 is a perspective view showing the orientation of the frame, two sets of mandrels, the drive motors and the add/remove a sign fixture;

FIG. 17 is an enlarged perspective rear view of the panels making up the window and the associated tensile members;

FIGS. 18A-18D are enlarged perspective views illustrating details of the tensile member attachment to the frame;

FIGS. 21A-21C illustrates a cable attachment for a replacement sign roll;

FIGS. 22A-22C illustrates a trolley on a boom of the cable hoist used to lift a replacement sign roll;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
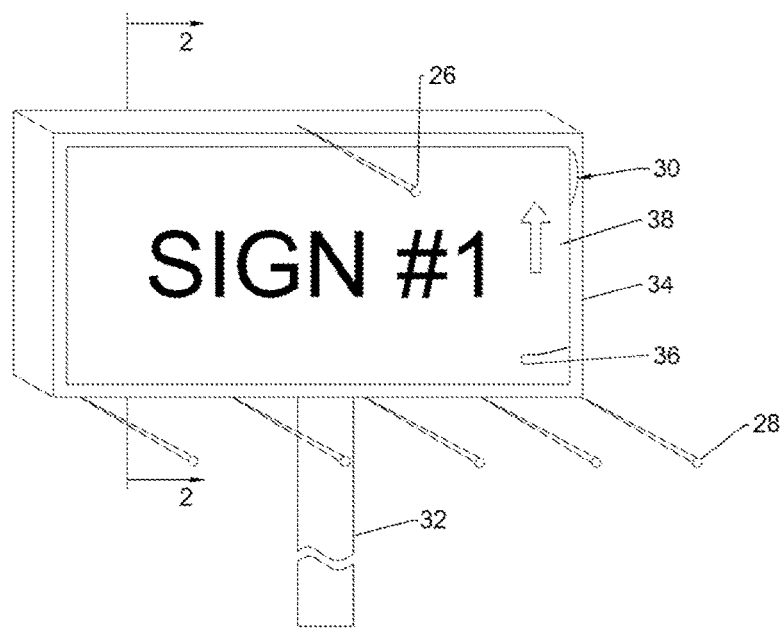
FIG. 1 is a perspective view of a scrolling billboard on an outdoor advertising structure.
Figure 2:
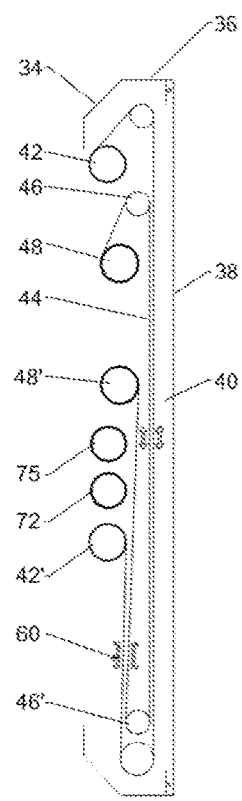
FIG. 2 is a cross-sectional side elevation of the scrolling billboard taken along line 2-2 in FIG. 1.
Figure 3:
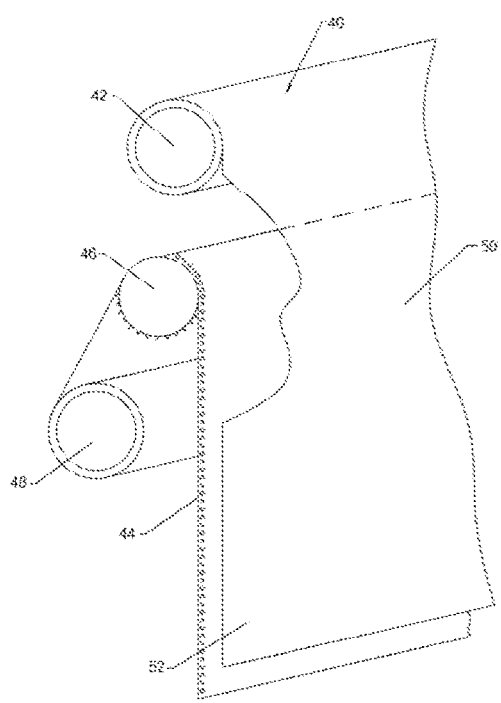
FIG. 3 is a partial perspective view of the scrolling curtain partially cut away to show the scrolling side there behind.

FIG. 1 illustrates a scrolling billboard 30 mounted on a typical billboard on a post or support structure 32. FIG. 2 is a simplified cross-section of a scrolling billboard 30. The scrolling billboard is provided with a peripheral framed structure 34 defining an opening 36 in which a transparent plastic window 38 is mounted. Immediately behind a window 38 is curtain 40 which is held between a pair of elongate mandrels 42 and 42'. As the curtain mandrels are rotated the curtain 40 transitions between an open position and one or more closed positions. In the open position a sign image on banner 44 is visible through window 38. Banner 44 wraps around upper and lower idle rolls 46 and 46' that are wound about elongate sign mandrels 48 and 48'. By rotating the sign mandrels of 48 and 48' the banner 44 can be moved in order to expose a different sign image. The large sectional perspective view of the upper corner of the curtain, sign mandrel and banner idle support roller is show in FIG. 3. Curtain 40 is shown in partial cutaway view wrapped around curtain mandrel 42. In this embodiment, curtain 42 has an opaque section 50 in a transparent section 52. The distal ends of the curtain 40 are attached to curtain mandrels 42 and 42'.

Immediately behind curtain 40 is sign banner 44. The sign banner 44 is wrapped over sign idle roller 46 and is wound about sign mandrel 48. Sign mandrel 48 is driven by a motor (not shown) to advance the sign in a desired direction.

Figure 4:
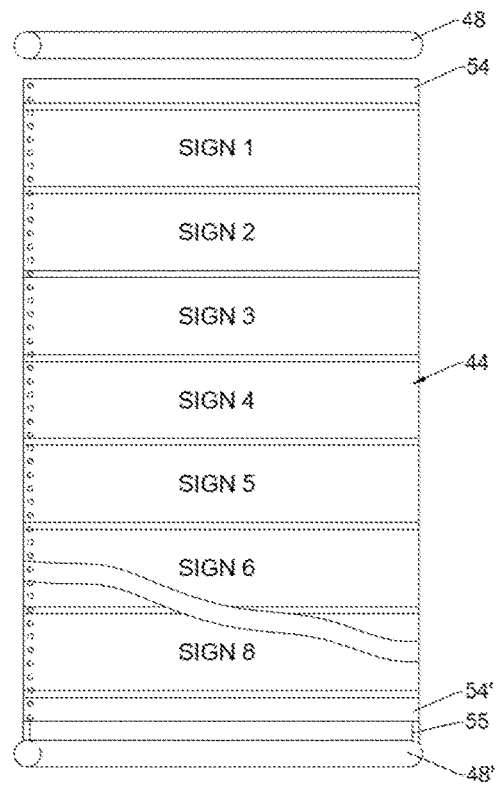
FIG. 4 is a view of a sign banner and associated support mandrels.
Figure 5:
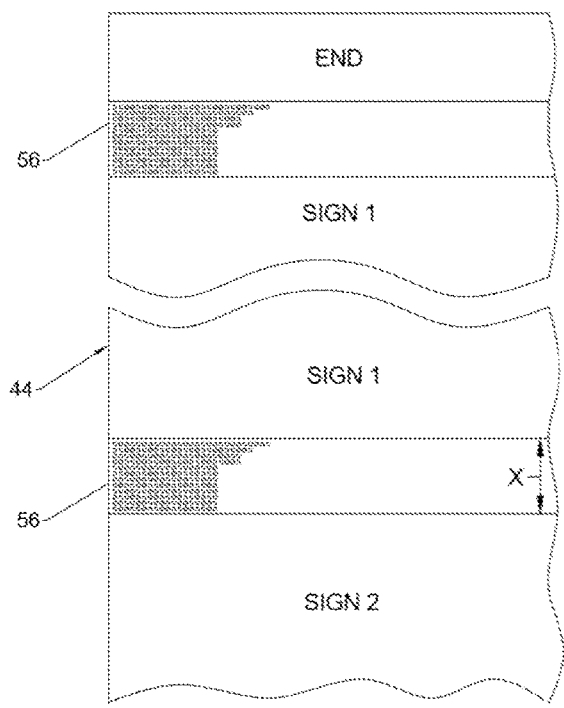
FIG. 5 is an exploded enlarged view of the sign banner showing the spacing between adjacent signs.

FIG. 4 is an unrolled cutaway view of the sign banner 44 and the associated mandrels 48 and 48'. The banner 44 is provided with wide end margins 54 and 54' which can be attached to the mandrels 48 and 48'. An enlarge view of the sign banner 44 is shown in FIG. 5 illustrating the perforated section 56 between each sign image. The perforations enable the banner to be cut and reconnected, so a sign image can be added or removed, and the ends of the banner rejoined in actuate alignment. The perforation are preferably space horizontally 1-3 feet apart. A plurality of rows, preferably 4-10 rows of perforations are provided between sign images, with the rows spaced less than 2 inches apart, preferably about 0.75 inches apart.

Figures 6A, 6B, 6C:
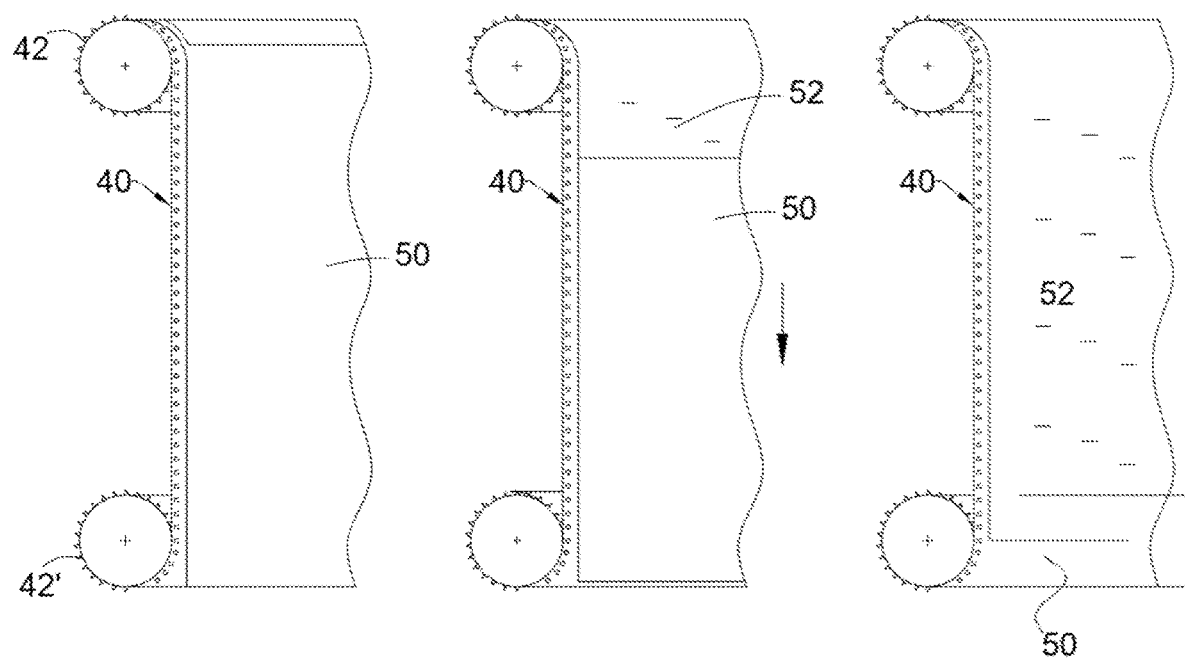
FIGS. 6A-6C are a series of partial perspective views showing a sign curtain having an opaque section and a transparent section moving between the closed position and the opened position.

One example of a curtain 40 is shown in FIGS. 6A to 6C has an opaque section 50 and a transparent section 52 wound about upper and lower curtain mandrels 42 and 42'. By rotating the curtain mandrels, the curtain 40 moves vertically as illustrated. Optionally the curtain can be provided with an opaque blank panel 50 shown in FIG. 6A and one or more panels having sign images. When sign images are provided on the curtain banner the images are preferably separated by perforated sections like the sign banner perforated section 56 shown in FIG. 5. When switching between images are displayed on the curtain images they are advanced in one at a time in sequence. Switching between adjacent curtain images takes about 1 second. By moving the curtain shown in FIG. 6B to the transparent panel shown in FIG. 6C, the rearwardly located sign banner 44 is visible. When an opaque curtain section is displayed the sing banner can be moved to any desired location without causing a visual distraction. When the curtain is transparent, the sign banner can be advance one position, up or down. If more than one sign position are to be changed the curtain is moved to an opaque panel to avoid the visual distraction of the sign scrolling for a period of more than about 1 second. Preferably, upper and lower sign mandrels and the curtain mandrels can each be driven by their own drive motors which are moved in a synchronized manner by a computer controller.

The curtain and the sign banner has scale and indicia 41 imprinted on the marginal edge of the curtain and the sign banner which is sensed by a camera 43 to precisely position the curtain or sign in the window opening. The camera provides a position signal to the controller which drives the sign and curtain rollers. as will be described with reference to FIGS. 7A-9I as signs are added or removed the spacing between sign images changes by a length corresponding to the perforation spacing, or 0.75 inches in the illustrated embodiment, the controller keeps track to the sign image spacing in order to properly position the image in the window opening.

FIGS. 7A-9H illustrate the process of adding a new sign to sign banner 44. To simplify the explanation only the sign banner 44 is illustrated passing through sign holder 60. In the preferred billboard embodiment 30 both the sign banner 44 and the curtain 40 will pass through cutting station 60. At the end of sign banner 44 and the curtain 40 an elongate transverse opening 55, or openings will be provided. When the sign banner is to cut the opening in the curtain will be oriented in the cutting station. When the curtain is to be cut the opening 55 shown in FIG. 4, is oriented in the sign cutting station 60 so curtain 40 can be cut without damaging the sign banner 44.

FIG. 7A illustrates a cutting position of the sign banner 44 before the sign banner is cut. In the example illustrated a sign is desired to be inserted between two sign images. The location of the junction between the images having a perforated section 56 (shown in FIG. 5) is positioned adjacent to splicing station 60. the splicing station 60 has spaced apart front and rear elongate beams providing sign holders 62 and 62'. In FIG. 7B the splicing station 60 sign holders 62 and 62' are moved into engagement with sign banner 44. Pins 64 on the front sign holder 62 extend through the perforations in the sign and enter apertures 66 and 67 in the rear sign holder 62'. While the sign is clamped the operator cuts the sign banner by extending a knife through slot 68 in the rear sign holder and moving the knife horizontally along the substantially the entire width of the sign banner. The marginal edges of the sign banner extending beyond the opening severing sign banner 44.

Figure 7E:
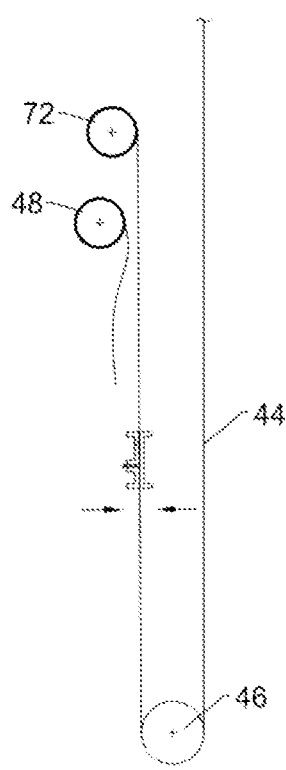

Once the sign is severed, the sign holders are separated as shown if FIG. 7C. The lower sign is held on a lower row of pins 64 on the front sign holder 62. The upper sign edge is removed from the upper row of pins 65 by the operator and place on retainer pins 70 on the rear of the sign holder as shown. The operator then pulls down from the sign-to-be-added from roll 72 as shown in FIG. 7D and the perforated edge of the sign is placed on rows of pins 64 overlapping the edge of the sign below. The sign holders are then clamped together as shown in FIG. 7E with the row of pins 64 and 65 extending through upper and lower rows of apertures 66 and 67. A weld bar that extends the length of the sign is heated to welding temperature and moved into contact with the overlapping marginal sign edges to form a secure weld joint. Alternatively, the operator can apply a bead of adhesive along the marginal edge of the lower sign with a glue dispenser. Optionally the glue dispenser may be moved by a motor along the length of the sign holder. Once the adhesive is applied the sign to be added in pulled down from the sign-to-be-added roll 72 as shown in FIG. 7D and the perforated edge of the sign is placed on rows of pins 64 overlapping the adhesive bead on the edge of the sign below.

The sign holders are then clamped together as shown in FIG. 7E with the row of pins 64 and 65 extending through upper and lower rows of apertures 66 and 67.

Figure 7F:
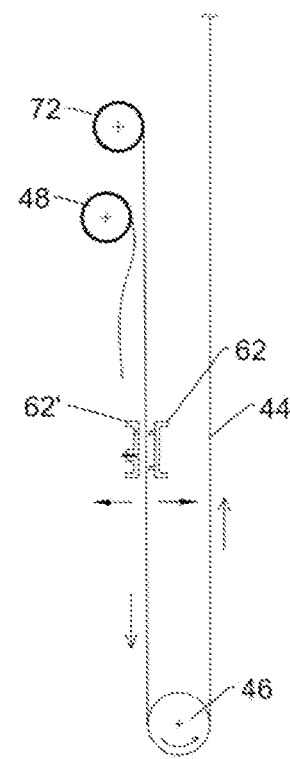
Figure 7G:
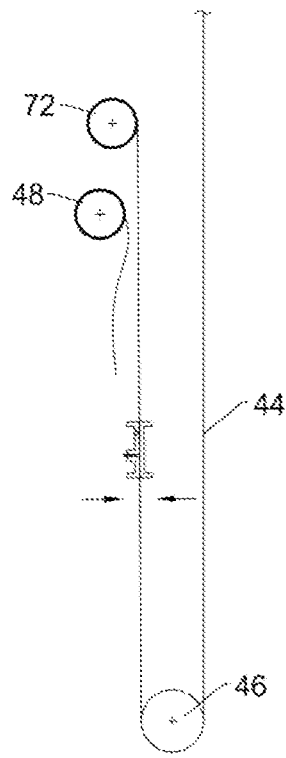
Figure 7H:
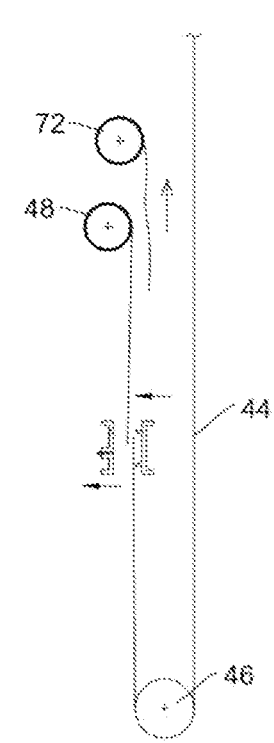

Once the weld has cooled or the adhesive is cured, the sign holders are moved apart as shown in FIG. 7F and the sign is advanced adding a new sign image to the banner 44. After one or more signs have been added the sign is positioned in the add/remove fixture in the next cut position as shown in FIG. 7G. The sign holders are clamped as shown and the sign cut by the operator as previously shown in FIG. 7B. The roll of signs to be added is retracted as shown in FIG. 7H. A bead of adhesive is applied to the edge of the lower held on retainer pins 64. After the glue is applied the edge of the sign held on retainer pins 70 is then placed on row of pins 64 and 65 overlapping the adhesive. The sign holders 62 and 62' are clamped together.

Figure 8A:
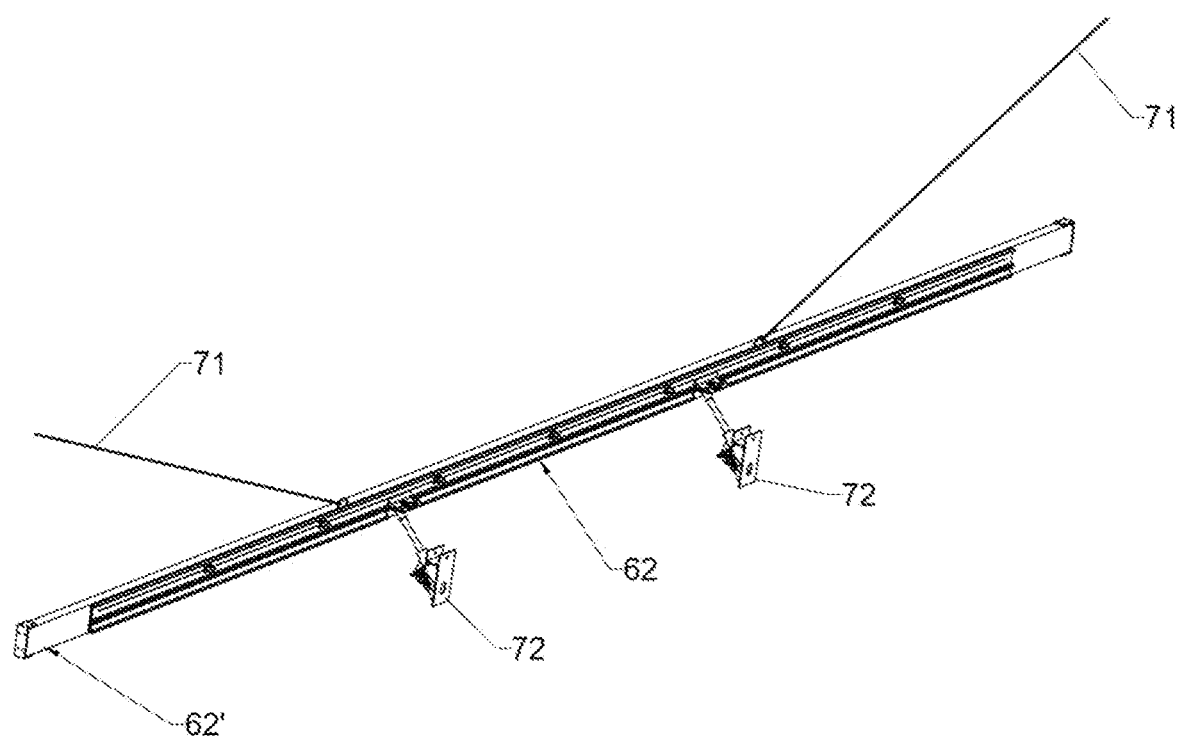
FIGS. 8A and 8B are perspective views of the add/remove a sign fixture.
Figure 8B:
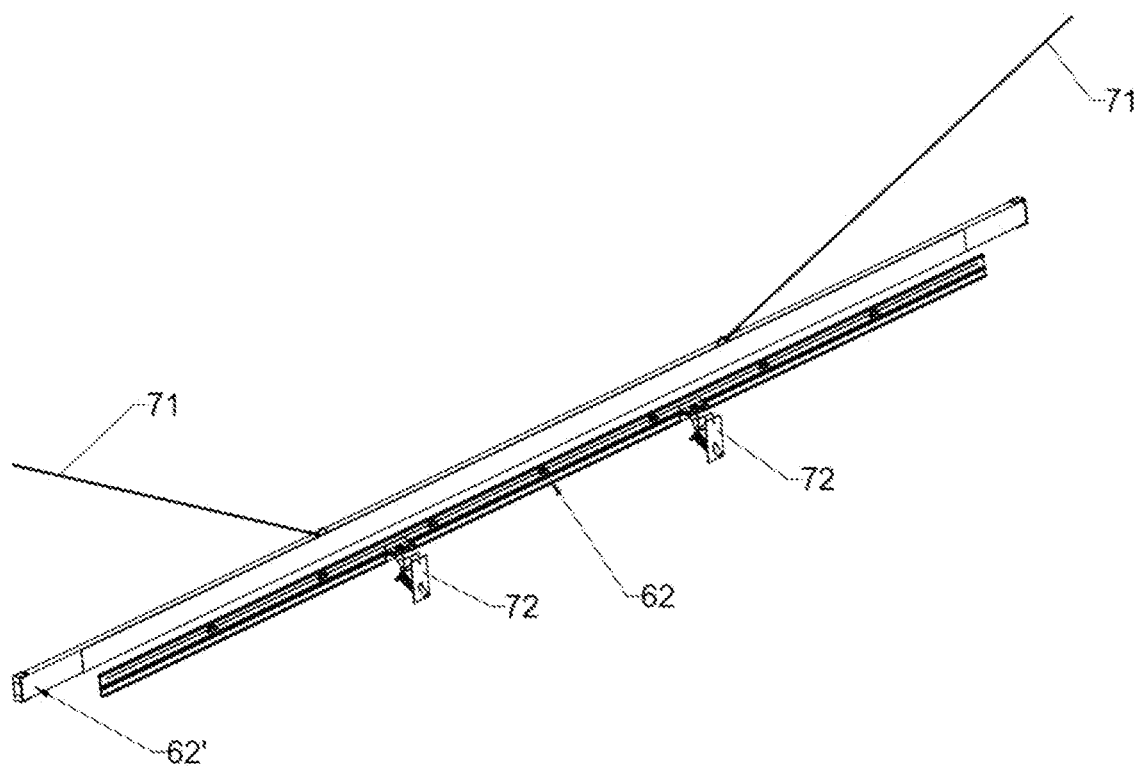

A perspective of the splicing station 60 is shown in FIGS. 8A and 8B. Sign holder 62 extends the length of the sign attached to the frame at it two ends. Cables 71 are attached to spaced apart regions of sign holder 62 to prevent sagging. Sign holder 62' is pivotably attached to the frame (not shown) by arms 72 and 72' which pivot together to clamp the sign banner and pivot apart to free the banner. The arms are spring biased in a bistable manner enabling the operator to move the sign holders 62 and 62' between a closed clamped position and an open clear position either manually of with a pair of actuators 73.

In the weld joint embodiment, the weld bar maintain the sign holders 62 and 62' tightly clamped together throughout their length during the welding process. In the adhesive glue joint embodiment to maintain the sign holders 62 and 62' tightly clamped together throughout their length during curing of the adhesive glue spring clamps 74 shown in FIG. 9A-9C are placed 6 to 12 feet apart on pins 64 and 65. The pins are provided with a annular grove 69 which receives a U-shaped slot adjacent to tip to which one end of the glue spring clamp 74 is attached, The other end of the glue spring clamp urges the sign holder 62' against holder 62. Upon curing of the adhesive, the sign addition is complete, the glue spring clamps are removed and the fixture is opened by separating sign holders 62 and 62' and the sign banner is advanced to the sign desired position. Alternatively, rather than using glue spring clamps, toggle clamps can be provided to engage the free ends of the pins and clamp sign holders 62 and 62' tightly together.

Alternatively, a hot melt adhesive can be applied to the curtain or banner and heated in the add/remove fixture by a heating element on one or both of the sign holders 62 and 62'. The heating element can be further used to melt the adhesive to remove an added sign at a later time and the adhesive and be reused multiple times. In another embodiment, two-sided tape can be used to join the edges of a sign after a sign has being added or removed from the banner. In yet another embodiment the edges of a sign can be welded together with a heating element after a sign has being added or removed from the banner.

The location of a sign which has been added or removed from the banner will be programmed into the system controller. The controller can then be programed to position the appropriate sign within the window at the desired time. Similarly, the controller can be programmed to accommodate the change in spacing between the signs due to the cutting and overlapping of the edges of the sign during joining. Although the loss of length of a single sign change is minimal, the accumulated effect of a number of sign changes over a period of time could adversely affect sign position. Compensating for sign position changes due to sign overlap during joining is preferred. In order to accurately position the sign images locator marks or indicia are provided on the marginal side edges of the banner and the curtain. These indicia are sensed by a scanner or camera mounted to the frame to enable closed loop feedback to the controller during sign movement.

The controller is programed to control the motors for a soft start, followed by a very rapid acceleration. The maximum sign speed is approximately about 25 feet per second (18 MPH). The sign banner is controlled to accelerate and deceleration without tearing the Signs or Curtains. Preferably signs and curtains are changed within in one second. The controller needs to adjust motor speed based on the diameter of the rolls as roll diameter changes is constantly changing as the sign or curtain is scrolled between the upper and lower mandrels.

Figure 11:
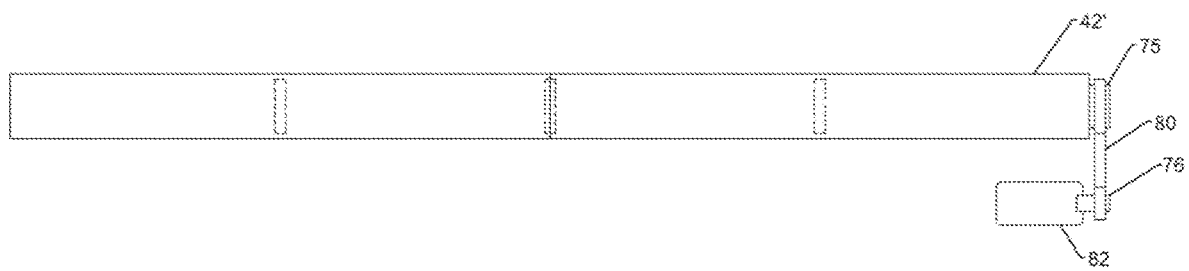
FIG. 11 is a view of the curtain the mandrel and the associated drive motor.

FIG. 10 is a rear perspective view of the billboard with the enclosure panels and window removed along with the curtain and banner to expose the drive system for the curtain and sign banner. At the top and bottom of the frame are curtain mandrels 42 and 43'. The upper curtain mandrel 42 is hidden by the upper frame rail and is shown in the cut away section. Due to the extreme length of the curtain mandrels twisting of the mandrel during acceleration and deceleration cause problems when the mandrel is driven at one end. Accordingly, as shown in enlarged view in FIG. 11, mandrel 42' is provided with a sprocket or cog wheel 75 at each end which is connected to a sprocket or cog wheel 76 mounted on drive shaft 78 by a chain of cog belt 80. Drive shaft 78 is pivotally mounted on the frame and is driven by a motor 82 driveably connected to the center of drive shaft 78.

Figure 12:
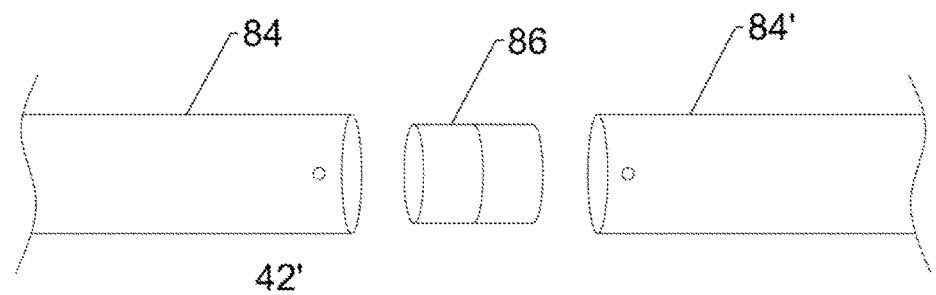
FIG. 12 is an exploded side view showing the connection between adjoining mandrel sections.

In the illustrated embodiment, the curtain mandrel 42' is an aluminum tube having a diameter of approximately 4-6 inches and a length of approximately 48 feet. The curtain mandrel is made of a plurality of tubular sections which are coaxially joined together. In the embodiment illustrated, the curtain mandrel is made from four approximately 12-foot sections. FIG. 12 illustrates an exploded enlarged view of 2 cylindrical segments 84 and 84' which are joined together by a tubular tapered coupling 86 which wedges into adjacent ends of tubular section 84 and 84'.

Figure 13:
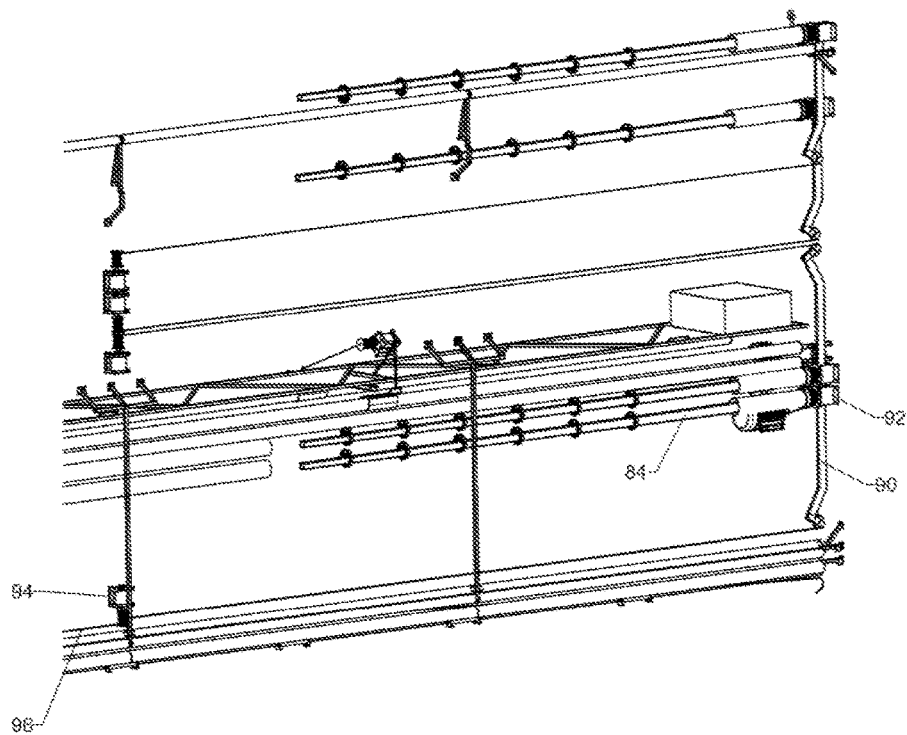
FIG. 13 is a partial perspective view showing the orientation of the lower curtain mandrel support with the mandrel removed.

FIG. 13 illustrates a view of the frame with covering panels, curtain and sign banner removed to illustrate the internal mandrel support 86. A pair of mandrel supports 86 extend inwardly from each end of the curtain mandrel 42' to internally support the tube to prevent it from sagging due to the weight of the curtains. As the curtains move between the upper and lower mandrel support, the weight of the curtains on the individual mandrel supports 42 and 42' will vary depending on the weight of the curtains wound about the mandrel. Accordingly, the mandrel supports 86 are pivotally mounted at an end adjacent the frame and are moved upward or downward within the tubular mandrel to compensate for the weight of the curtain.

Figure 14A:
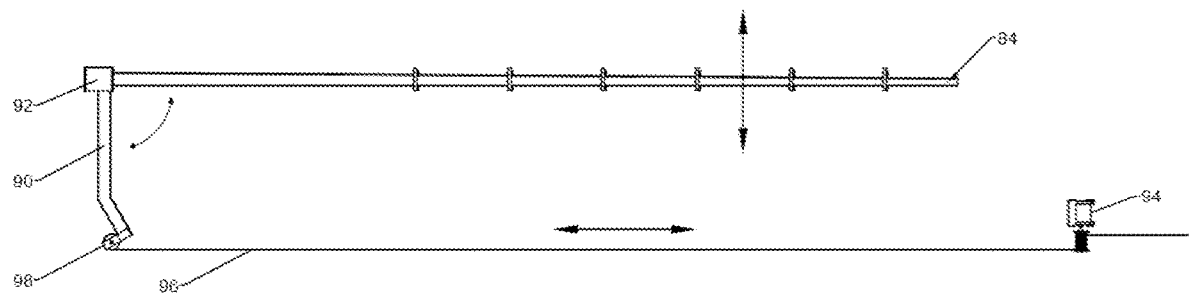
FIGS. 14A-14C are a partial side view of a mandrel showing the orientation of the mandrel support and mandrel support drive motor and a cutaway side views of a mandrel, showing the orientation of the mandrel support.
Figure 14B:
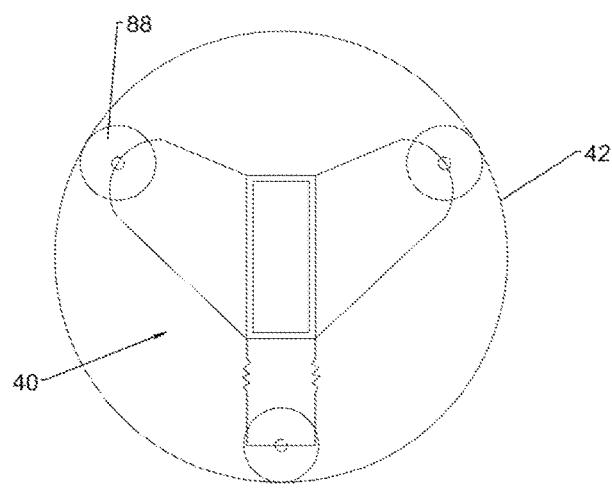
Figure 14C:
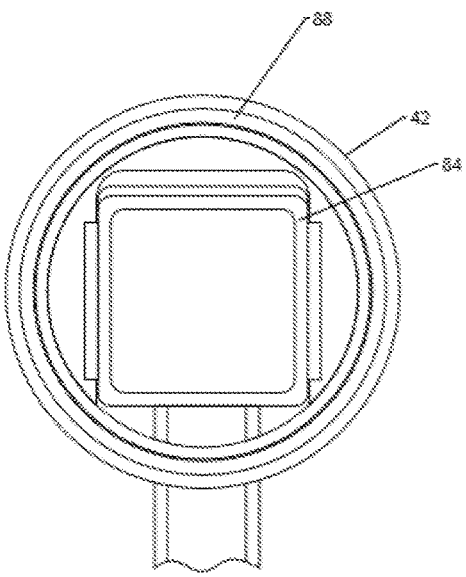

The mandrel support 84 is shown schematically in FIG. 14A. The mandrel support is generally L-shaped member with a long leg 86 extending horizontally into the interior of the curtain mandrel. The long leg 86 of the mandrel support is preferably 35 to 45% of the length of the mandrel, which in the embodiment illustrated, is approximately 18 feet. The mandrel support long leg 86 in the embodiment illustrated is a tapered tube of vertically aligned rectangle cross section which supports a series of roller supports 88 spaced along its length. Roller supports 88 in the embodiment illustrated, as shown in FIG. 14B, have three circumferentially spaced apart rollers pivotally mounted to a long tapered support section 86 with the lower roller being spring biased against the mandrel inner diameter wall. FIG. 14C is a cross-section of the mandrel support 84 adjacent the tube end where the mandrel support section 86 is the largest.

The short leg 90 of the mandrel support 84 extends parallel to the edge of the curtain extending upwardly in the case of the lower curtain mandrel and downwardly in the case of the upper curtain mandrel. The short leg 90 has a distal end connected to a mechanical actuator for pivoting the horizontal long leg 86 upwards or downwards about a pivot point 92 connected to frame 34. The mechanical actuator in the disclosed embodiment is provided by a motor 94 connected to a corresponding nut 98 pivotally mounted on the distal end of the short leg of the mandrel support 90. The similar mandrel supports are provided at each end of the curtain mandrels 42 and the sign mandrels 48. By knowing the curtain position and the curtain weight can be calculated and the mandrel supports can be adjusted using a computer controller. Preferably deflection from the horizontal axis can be limited to +/−1 inch over the entire length of the tube and preferably less than ½ inch. In the illustrated embodiment, using an 18 foot long mandrel support long leg 86 having six spaced apart roller assemblies 88, sign mandrel deviation from the central horizontal axis can be maintained at below +/−¼ inch throughout the range on curtain movement.

Figure 15A:
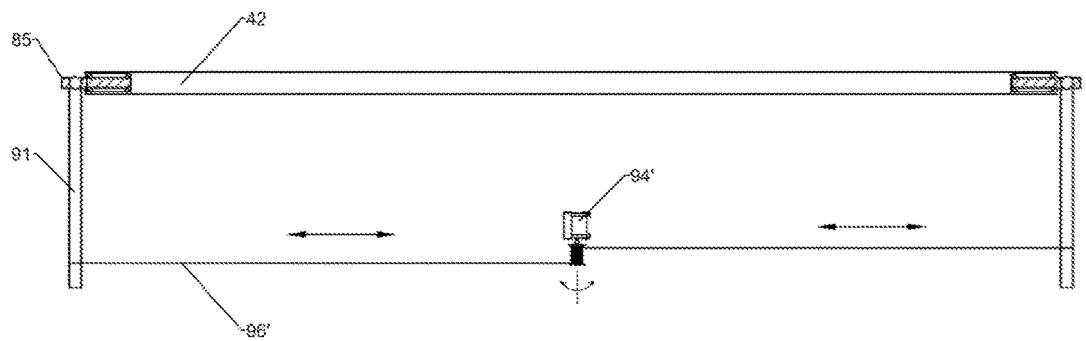
FIGS. 15A-15B are a partial side view of an alternate mandrel assembly showing the orientation of the alternate mandrel support and mandrel support drive motor and an enlarged cutaway side view of a mandrel support.
Figure 15B:
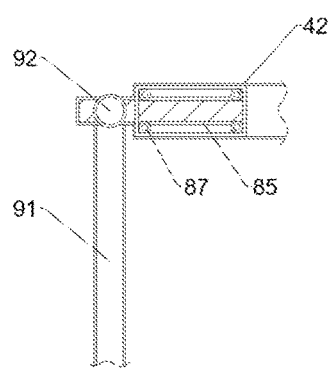

FIGS. 15A and 15B illustrates an alternative embodiment of a mandrel support having a short support shaft 85 having a length of about 3 feet which is pivotably connected to the frame for movement about pivot pin 92' oriented along a horizontal axis generally perpendicular to the mandrel 42. A pair of spaced apart bearings 87 shown in FIG. 15B are mounted on the short support shaft 85 to engage a tubular reinforcement 89 affixed within the end of the mandrel. Arm 90' is attached to and extends generally perpendicular to the short support shaft 85 and is inwardly biased by cable 96' connected to motor 94' similar to the FIG. 14A embodiment.

Figure 16:
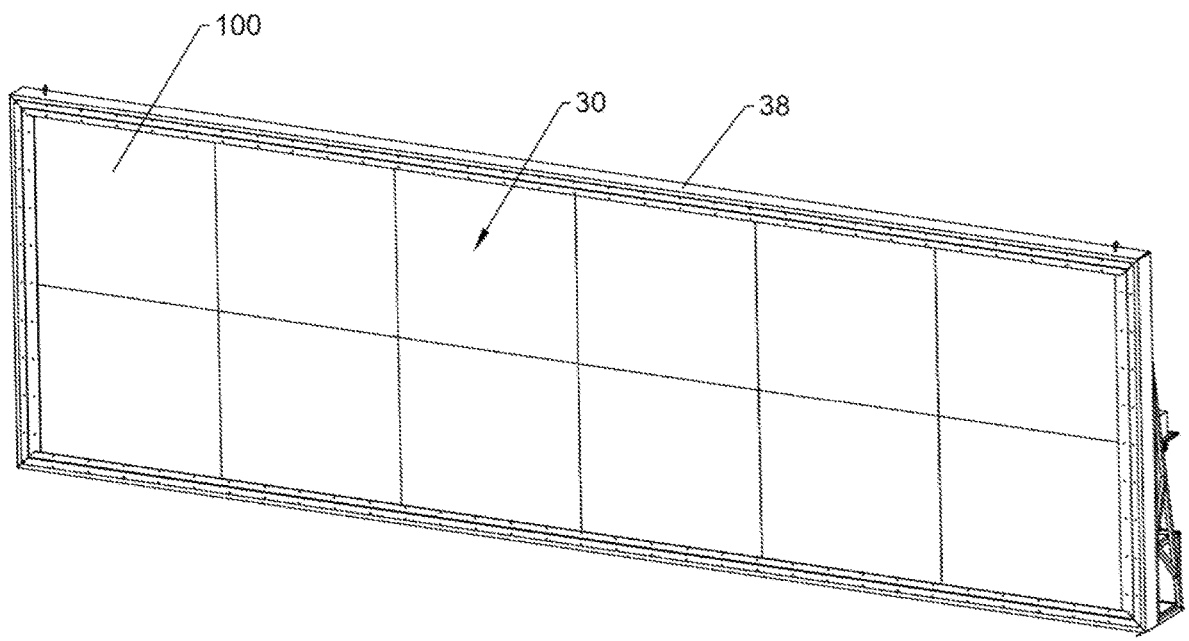
FIG. 16 is a perspective view of the front of the sign showing the orientation of the panels making up the window mounted in the frame opening.

FIG. 16 illustrates the front of the scrolling billboard 30 having a window 38 comprising a series of small window panels 100 which are joined together to form window 38 with a smooth, substantially flat exterior surface. Preferably the window panels 100 are 4' by 7' in size when used in a 14' by 48' billboard. The exterior surface of window 38 is preferably provided with anti-reflective or a non-glare surface spaced less than 2-4 inches of the sign banner 44, preferably less than 2 inches.

The individual window panels 100 in the illustrated embodiment are made of an injected molded acrylic material having a UV stabilizer. The panels are glued together using extruded clear plastic connector strips 102 shown in FIG. 17. The individual window panels 100 have a peripheral flange on the rear surface as shown in FIG. 17 which interlock and are preferably glued together. The peripheral flanges are provided with mounting structure for receiving vertically extending tensile members 104 which in the embodiment illustrated are ¼ inch diameter steel rods. These rods are loaded in tension and provide structural rigidity to the window assembly 38 minimizing deflection due to wind loads. Tensile members 104 freely pass through an opening in connector 102 as shown in FIG. 17.

FIGS. 18A to 18D illustrate the orientation of channel 108 and tensile members 104. To accommodate the expansion or contraction of the acrylic front panel due to changes in temperature the tensile members 104 are mounted at each end on roller assemblies 106 mounted to a window sealed channel 108 extending about the periphery of the window. Channel 108 is U-shaped in cross section and has sufficient depth that to accommodate expansion or contraction of the acrylic front panel due to normal temperature variations expected in use. Accordingly, the channel in the illustrated embodiment must be capable of accommodating 1.5 inches of vertical movement and about 3.5 inches of horizontal movement of the plastic window panel do to thermal expansion.

In order to maintain a water and air tight seal, the window preferably has a plastic seal frame 110 glued to the marginal edge of the window panel so that the seal frame moves and is sealably cooperates with the channel 108. The elongate tensile members 104 extend through the seal frame 100 and extend through slots in the upper surface of the channel 108. Roller assemblies 106 are connected to the ends of the elongated tensile members 104 to maintain the tension as the plastic front acrylic panel expands or contracts with the atmospheric temperature variations. Preferably coil springs 112 are positioned about the tensile members 104 as illustrated biasing the seal member 110 away from the inner surface of channel 108 to maintain the window centered in the window opening and seal connected to the frame 34. Preferably the tension in vertically extending tensile members is maintained in state of tension of 100 to 200 pounds.

The weather tight seal of the acrylic window 38 relative to the frame 34 enables the interior cavity defined by the scrolling billboard assembly to be maintained in a pressurized state slightly above atmospheric pressure. The frame 34 has the window panel 38 which is sealably connected to the frame defining a weather tight front facing surface. The rear surface of the scrolling billboard is enclosed by a rear panel having a access door having a peripheral seal. The access door provides access to the curtain and sign in order to change signs as previously described. A pressure sensor is located within the interior cavity and the microprocessor controller operates an air pump to maintain the interior cavity pressure at 0.2 to 0.3 psi above the atmospheric pressure. Maintaining a positive internal assigned pressure minimizes the fluttering and deflection of the window panel due to wind loads. By maintaining a positive pressure, a thinner window panel and/or fewer tensile members can be used.

Figure 19:
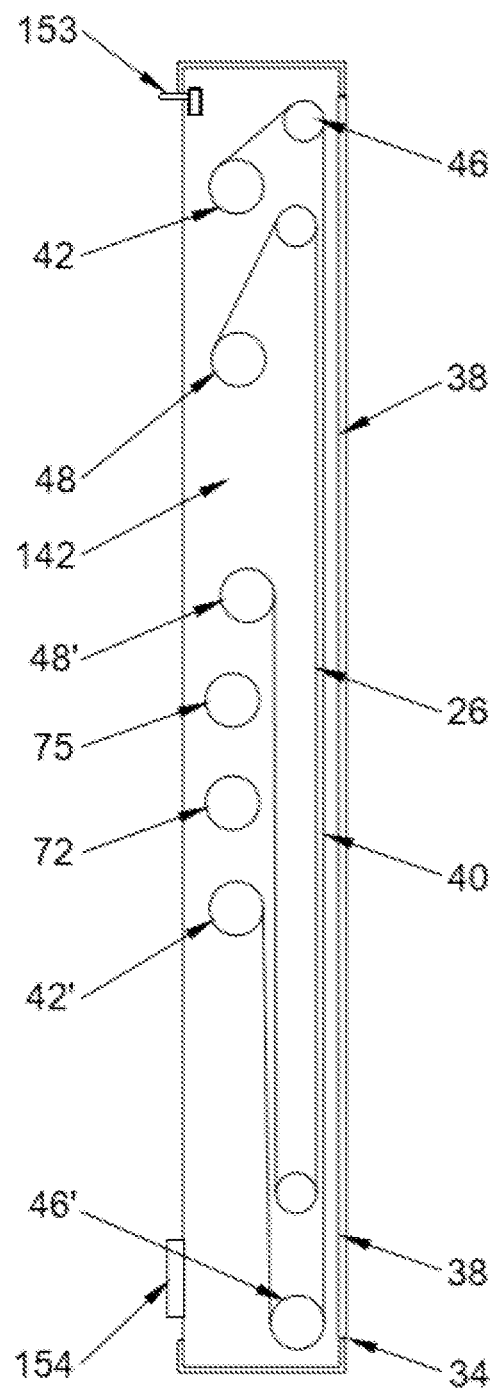
FIG. 19 is a simplified side view illustrating the sealed frame enclosure and air pump for maintaining a positive pressure within the enclosure.

The air pressure system control the internal pressure within the billboard. When the billboard access panels are closed the internal cavity within the billboard is substantially air tight. Preferably the pressure of internal cavity 142 shown in FIG. 19 is maintained at 0.2 to 0.3 psi above the atmospheric pressure. The air pressure system is structure is illustrated schematically in FIG. 25. An air pump 144 draws air from outside of the internal cavity 142 of the billboard. The pump discharges pressurized air to an accumulator tank 146. The output of the tank is regulated by an electrically controllable flow control valve 148. Air leaving the flow control vale flow into a manifold 150 which discharges air uniformly along the length of the internal cavity 142. A pressure transducer senses the internal cavity pressure and a stain gage measures the deflection of the plastic window 38. Ideally the pressure is maintained so that the window is outwardly bowed 0.25 to 0.5 inches. When the window varies from the desired bow do to wind loads a controller cooperating with the pressure transducer 152, the strain gage 154, the pump 144 and the flow control valve 148, varies the air pressure within the internal cavity 142. The flow control valve preferably is a multi-position spool valve which can also be used to vent the internal cavity pressure to atmosphere to reduce excess window outward blow.

Figure 24:
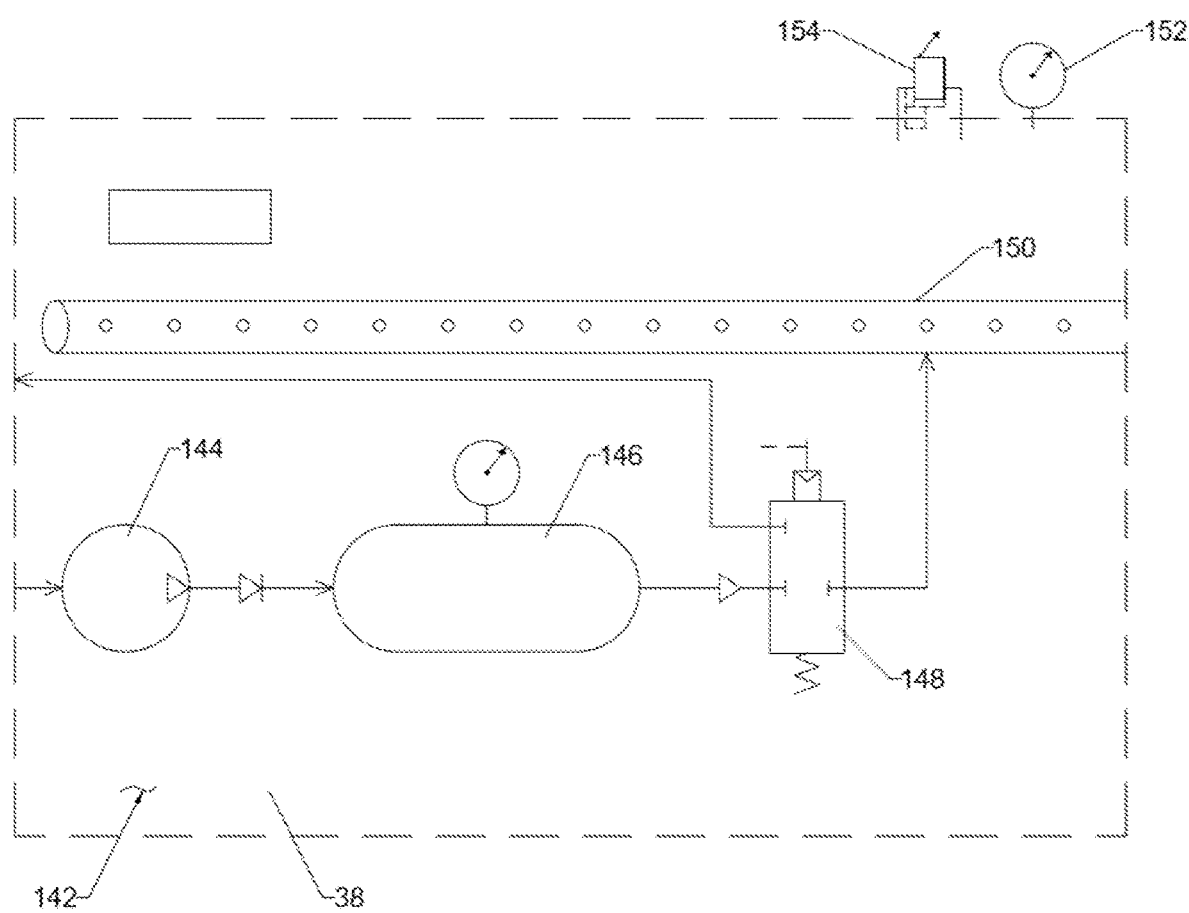
FIG. 24 illustrates an inflation stem for the billboard internal cavity.

The air pressure system structure is illustrated schematically in FIG. 24. The air pressure system controls the internal pressure within the billboard. When the billboard access panels are closed the internal cavity within the billboard is substantially air tight. Preferably the internal pressure is maintained at 0.2 to 0.3 psi above the atmospheric pressure. An air pump 144 draws air from outside of the internal cavity 142 of the billboard. The pump discharges pressurized air to an accumulator tank 146. The output of the tank is regulated by an electrically controllable flow control valve 148. Air leaving the flow control vale flow into a manifold 150 which discharges air uniformly along the length of the internal cavity 142. A pressure transducer senses the internal cavity pressure and a stain gage measures the deflection of the plastic window 38. Ideally the pressure is maintained so that the window is outwardly bowed 0.25 to 0.5 inches. When the window varies from the desired bow due do to wind loads a controller cooperating with the pressure transducer 152, the strain gage 154, the pump 144 and the flow control valve 148, varies the air pressure within the internal cavity 142. The flow control valve preferably is a multi-position spool valve which can also be used to vent the internal cavity pressure to atmosphere to reduce excess window outward blow.

The scrolling billboard is capable of scrolling sings and curtains at wind speeds of up to 40 MPH. A wind speed sensor 153 is provided on top to the frame to measure wing speed. When the wind speed exceeds a maximum speed limit the controller will prevent sign movement to prevent damage to the sign or curtain due to engagement with the window. The sign is capable of withstanding wind loads of up to 100 MPH and preferably 120 MPH with out damage.

Figure 20:
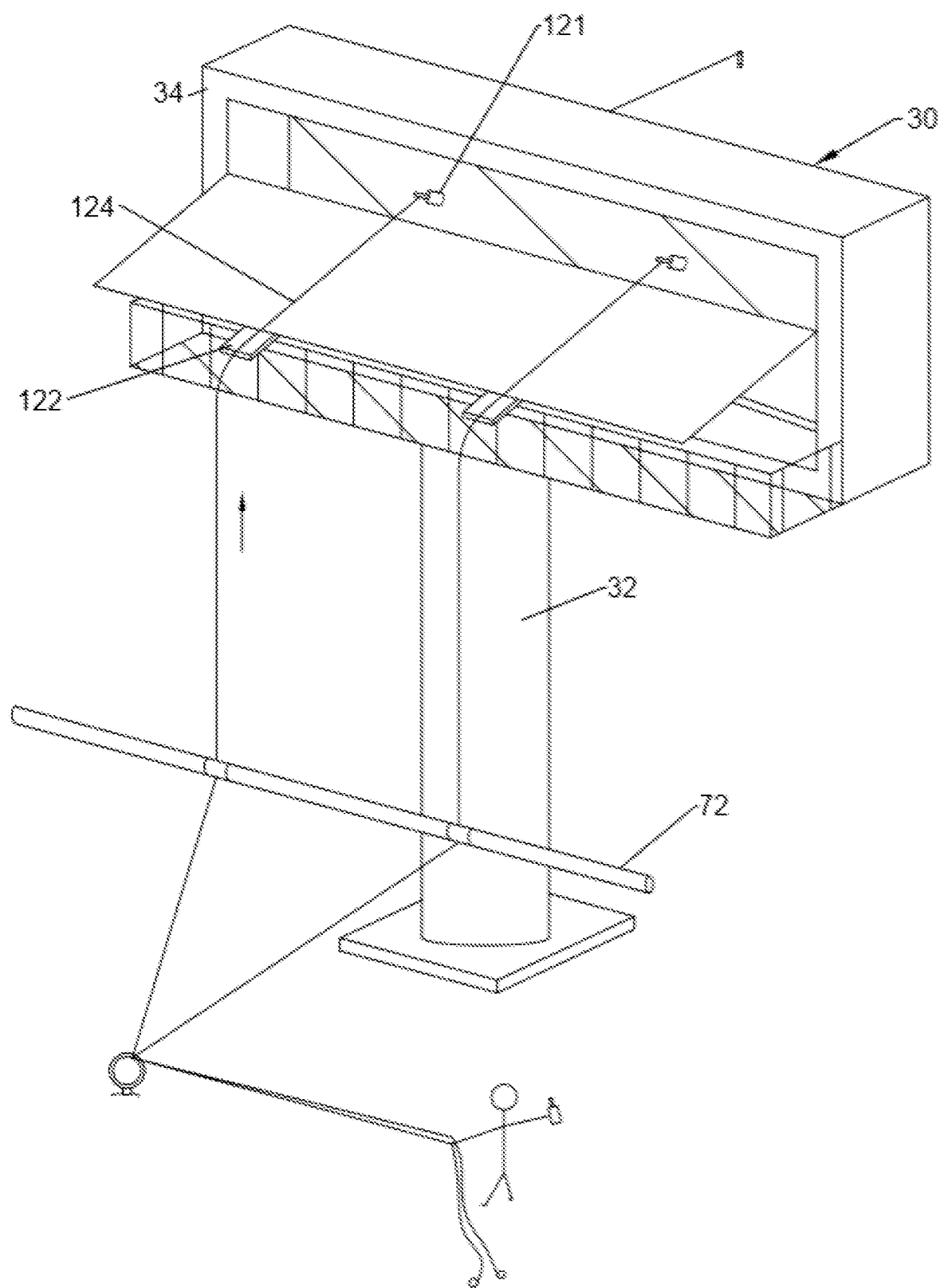
FIG. 20 illustrates a user raising a replacement sign up to the scrolling sign frame at a remote sign location.

FIG. 20 illustrates a single technician on the ground raising a roll to be added 72 up to the backside surface of scrolling billboard 30. The scrolling billboard 30 is shown atop the outdoor billboard structure positioned high above the ground. Mounted on the back the scrolling billboard 30 above the access door are two cable winches 120 mounted rear wall. Horizontal boom arm 122 stored within the frame enclosure rotated about a vertical axis to extend outwardly below the opened access door between an inboard and an outboard position (shown). When in the outboard position, the winch cables 124 are placed in pulleys at the distal end of the boom arms to so the hook on the end of the cable is lowered to the ground using a remote control. The boom arms have having a track 128 supporting a rolling dolly 130. The technician on the ground will attach the rolls to be added using a sling 132 and roll holder 134 and the roll to be added is raised. Preferably the new rolls to be added mandrel are received by a second technician on the billboard walkway as shown in FIG. 21A. The roll holder has a cone-shaped projection 136 which fits into a recess 138 in the tolley 130. Once in place the roll holder is affixed to the trolley with a pin, bolt or toggle clamp. The winch cable 124 is extended, and the hook 126 is detached from the roll holder 134 whereupon the trolley 130 and the attached roll to be added are rolled inwardly into position.

Once the roll to be added is positioned approximately at the ultimate mounting position for the roll to be added, the technician can place a pair of roll supports 140 under the roll to be added shown in FIG. 21B. The ends of the roll are then connected to conical mandrels rotatable end supports 141 mounted within the frame shown in FIG. 21C. Preferably three or four roll supports 140 are spaced along the length of the roll to be added and the ends of the roll to be added are supported by spring biased tapered conical mandrels rotatable end supports 141.

A more detailed view of the sling 132 and the roll holder 134 are shown in FIGS. 22A-22C. The sling is a simple sheet metal roll form having hook-like marginal edges which engage corresponding marginal edges of the roll holder in order to securely hold the two together without need of additional fasteners. This structure enables the sling to be easily removed by hand from the roll holder by the technician working up at the billboard surface.

Figure 23:
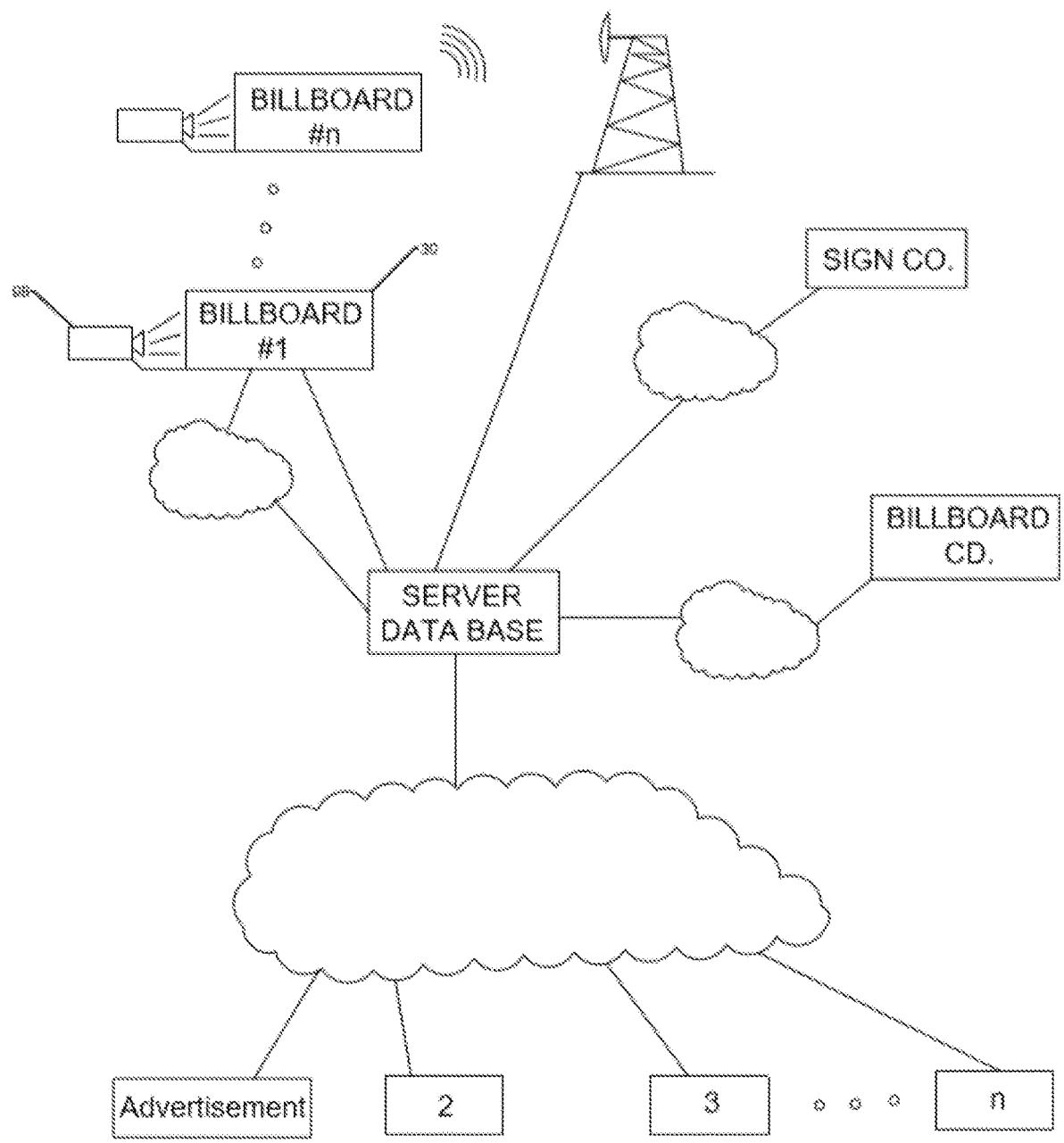
FIG. 23 illustrates a system for monitoring a network of billboards each having a digital camera to monitor the sign image, a digital camera is connected to a central server and data base accessible by the billboard company and its advertisers.

A scrolling billboard of the present design is particularly well suited for remote monitoring using a digital camera mounted at the sign site. A network for remotely monitoring a number of geographically spaced apart billboards is shown in FIG. 23. A digital camera 26 illustrated in FIG. 1 is mounted on the on the end of an elongate boom attached to frame 34 in order to take a wide-angle picture of the billboard sign. The camera can take a series of periodic still images associated with each sign change. Meta data associated with the digital image can store the time the image was taken, and potentially the length of time the sign was viewable in the most recent display. Using the digital image, one can monitor sign orientation, the image displayed, and even image fading and billboard illumination. In low ambient light conditions, a series of lights 28 attached to frame 34 illuminate the displayed sign image as shown in FIG. 1.

The digital camera 26 is connected to a controller in each of the scrolling billboards. The controller is capable of communicating with a remote server via a wi-fi link, a telephone or cable connection or via cellular telephone. A server stores the billboard image data in a database which can be accessible by the outdoor advertising company who would own the billboards and sells the advertising space, the sign company who built and maintains the billboard and the various advertisers who can monitor and verify the timely placement of their ads on the various billboards throughout the network. Utilizing the captured digital image, one can compare the sign color to a color master sign when new and monitor the changes in color due to fading in the sun as well as monitor the sign and illumination levels at night. That way the advertiser can ensure that the sign is adequately lit while being in compliance with the local light pollution ordinances.

A method of monitoring a sign on an outdoor billboard is accordingly provided by this network. The method comprises the steps of, mounting a digital camera to a billboard at a location to view the image displayed on a sign on the billboard and periodically capturing and storing a time stamped a digital color image of the sign. This captured image information is transmitted to a remote server via a communication link where it is stored. The captured image sign color can be compared to a color master to monitor so changes in sign color and sign illumination level can be monitored. The remote server is accessible by a remote monitor in order to check the display imaged, date and time, sign color quality and sign image illumination level.

Figure 25:
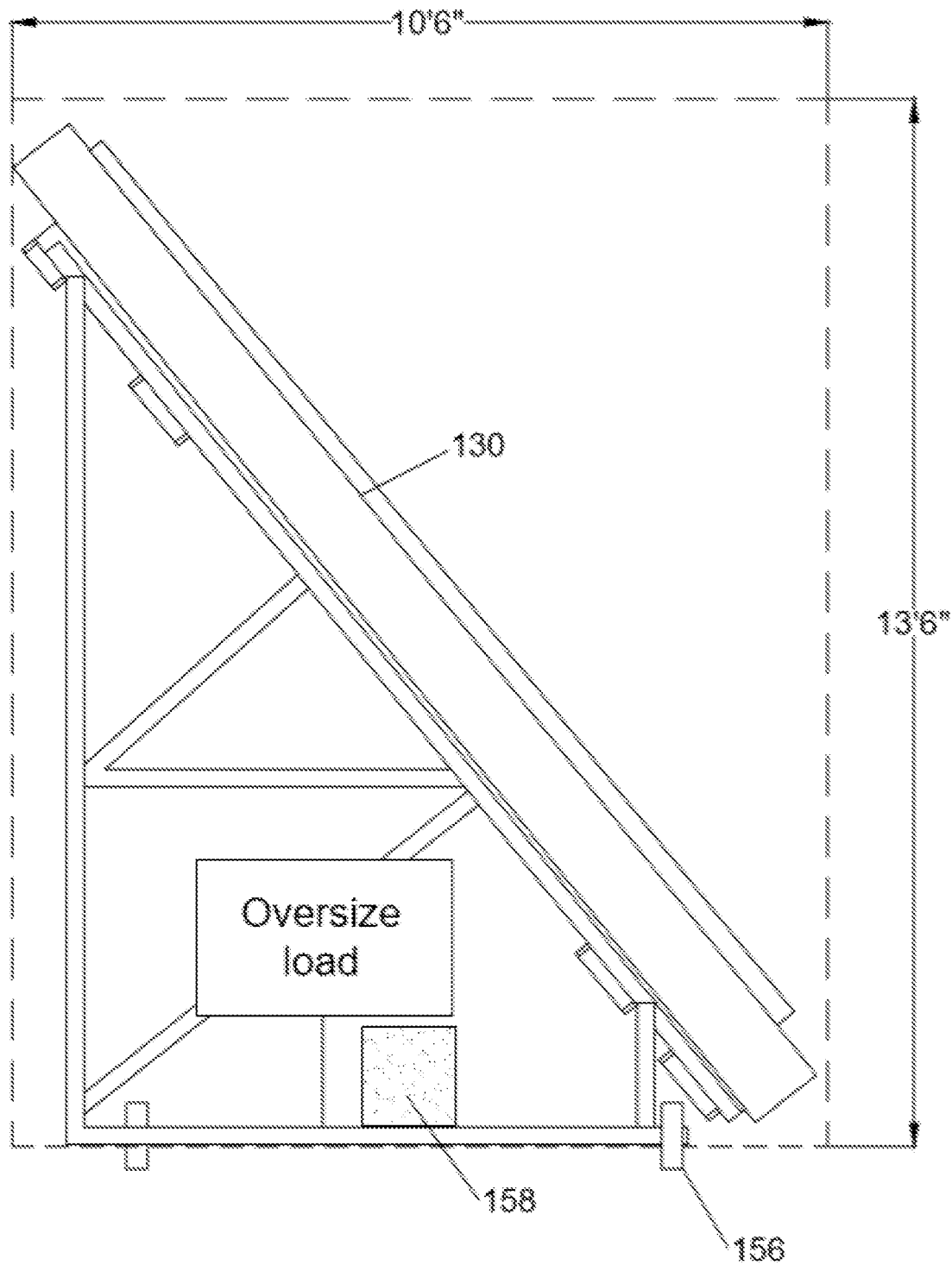
FIG. 25 illustrates an end view of a trailer for transporting a billboard over a roadway.

FIG. 25 is an end view of a trailer specifically adapted to transport a scrolling billboard of the present design on highways and city streets. The trailer can carry a billboard which is approximately 48 feet long and 15 feet high in fully assembled. The trailer is relatively low to the ground with small diameter wheels 156 enabling the top of the billboard to be less than 14 feet and preferably not more than 13½ feet above the ground. The enables the billboard on the trailer to fit beneath most roadway bridges. By a width of approximately 10½ feet the highway sign can be transported via heavy duty pickup truck, such as a Ford F350 or equivalent with a wide load permit.

The weight of the sign is not a concern when transporting the sign on the highway, however, the large sign size is an issue when it comes wind loading in severe wind loads environments. Accordingly, one or more large water filled bladder 158 are mounted low in the trailer providing a ballast weight of 4,000 to 6,000 pounds which is believed to be sufficient to withstand wind gusts of 80 MPH and preferably 90 MPH. The trailer is provided with 2 axle pairs of wheels. The wheels having a tract of at least 6 to 7 feet in order to provided adequate resistance to roll over as a result of wind side loads.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of monitoring a sign on an outdoor billboard, the method comprising:
   mounting a digital color camera adjacent to a billboard at a location to view the image displayed on a sign on the billboard;
   at least periodically capturing and storing a time stamped a digital color image of the displayed sign; and
   transmitting the captured image to a remote server via a communication link; and
   comparing the sign color to a color master to monitor changes in sign color and to monitor sign illumination level;
   wherein the remote server is accessible by at least one remote monitor in order to check the display image's date and time, sign color quality and sign image illumination level.

2. The method of claim 1, wherein the step of mounting s digital camera comprises providing an elongate arm attached at a proximate end to the frame structure with a distal end positioned outboard of the sign image and affixing the digital color camera to the elongate arm distal end in an orientation to view the sign image.

3. The method of claim 1, further comprising mounting a light adjacent to a billboard at a location to illuminate the image displayed on a sign on the billboard in low light conditions.

4. The method of claim 1, wherein the least one remote monitor enables an owner of the sign and an advertiser related to a sign image to check the captured displayed images.

5. The method of claim 1, wherein the remote server can store data related to a plurality of billboards.

6. The method of claim 1, wherein the step of periodically capturing and storing a time stamped a digital color image of the displayed sign occurs at least once with each sign change.

7. The method of claim 1, wherein the step of periodically capturing and storing time stamped a digital color images of the displayed sign occurs with each sign change provides an indication of the length of time the sign image was viewable.

8. A method of monitoring a sign on an outdoor billboard, the method comprising:
   providing a scrolling sign having a plurality of signs which can alternatively be displayed;
   mounting a digital color camera adjacent to a billboard at a location to view the image displayed on a sign on the billboard;
   mounting a plurality of lights adjacent to a billboard at a location to illuminate the image displayed on a sign on the billboard in low light conditions;

at least periodically capturing and storing a time stamped a digital color images of the displayed sign each time the displayed sign on the billboard is changed; and transmitting the captured images to a remote server via a communication link; and comparing the sign color to a color master to monitor changes in sign color and to monitor sign illumination level;

wherein the remote server is accessible by at least one remote monitor in order to check the display image's date and time, sign color quality and sign image illumination level.

9. The method of claim 8, wherein the step of periodically capturing and storing a time stamped a digital color image of the displayed sign occurs at least once with each sign change.

10. The method of claim 8, wherein the step of periodically capturing and storing time stamped a digital color images of the displayed sign occurs with each sign change provides an indication of the length of time the sign image was viewable.

\* \* \* \* \*

UNITED STATES PATENT AND TRADEMARK OFFICE
CERTIFICATE OF CORRECTION

| | |
|---|---|
| PATENT NO. | : 11,276,335 B2 |
| APPLICATION NO. | : 17/094285 |
| DATED | : March 15, 2022 |
| INVENTOR(S) | : Paul G. Angott et al. |

It is certified that error appears in the above-identified patent and that said Letters Patent is hereby corrected as shown below:

In the Claims

Column 12, Lines 34-35, Claim 2:
After "wherein the step of mounting"
Delete "s" and
Insert -- a --.

Column 12, Line 51, Claim 6:
After "capturing and storing a time stamped"
Delete "a".

Column 12, Line 55, Claim 7:
After "capturing and storing a time stamped"
Delete "a".

Column 13, Lines 1-2, Claim 8:
After "storing a time stamped"
Delete "a".

Column 13, Lines 13-14, Claim 8:
After "storing a time stamped"
Delete "a".

Column 13, Lines 17-18, Claim 10:
After "storing a time stamped"
Delete "a".

Signed and Sealed this
Ninth Day of August, 2022

Katherine Kelly Vidal
*Director of the United States Patent and Trademark Office*